United States Patent
Chen

(10) Patent No.: US 11,964,406 B2
(45) Date of Patent: Apr. 23, 2024

(54) LOCKABLE ROTARY CUTTING MAT

(71) Applicant: Chi-Jen Chen, Xihu Township, Changhua County (TW)

(72) Inventor: Chi-Jen Chen, Xihu Township, Changhua County (TW)

( * ) Notice: Subject to any disclaimer, the term of this patent is extended or adjusted under 35 U.S.C. 154(b) by 485 days.

(21) Appl. No.: 17/313,127

(22) Filed: May 6, 2021

(65) Prior Publication Data

US 2022/0355504 A1    Nov. 10, 2022

(51) Int. Cl.
*B26D 7/20* (2006.01)
*A47J 47/00* (2006.01)

(52) U.S. Cl.
CPC ............... *B26D 7/20* (2013.01); *A47J 47/005* (2013.01); *B26D 2007/202* (2013.01)

(58) Field of Classification Search
CPC ......... A47J 47/00; A47J 47/005; F16M 11/08; F16D 27/102; F16D 41/12
USPC .......... 108/22, 94; 269/57, 63; 192/84.8, 46, 192/76, 35
See application file for complete search history.

(56) References Cited

U.S. PATENT DOCUMENTS

| | | | | |
|---|---|---|---|---|
| 7,644,903 B2* | 1/2010 | Amato | ................... | F16M 11/08 108/94 |
| 7,942,395 B2* | 5/2011 | Okada | ..................... | B26D 7/20 269/57 |
| 2004/0056403 A1* | 3/2004 | Porchia | ................. | A47J 47/005 269/289 R |

* cited by examiner

*Primary Examiner* — Tyrone V Hall, Jr.
(74) *Attorney, Agent, or Firm* — Egbert, McDaniel & Swartz, PLLC

(57) ABSTRACT

A lockable rotary cutting mat includes a base plate and a rotary plate. The central bottom portion of the rotary plate is assembled on the center of the base plate through a rotary connector. The rotary plate includes a cutting surface and a periphery. The periphery is formed with concave edge portions, and a locking component is provided at the corresponding position between the base plate and the rotary plate periphery. The locking component includes a moving base, a controller and a locking edge portion. The controller can be pushed along a movement guiding axis on the moving base. The locking edge portion is connected to, and can be driven by the controller to have locked and released positions. When the locking edge portion is at the locked position, it is aligned to, and is engaged with the corresponding concave edge portion, so that the rotary plate is fixed.

6 Claims, 7 Drawing Sheets

LOCKABLE ROTARY CUTTING MAT

CROSS-REFERENCE TO RELATED U.S. APPLICATIONS

Not applicable.

BACKGROUND OF THE INVENTION

1. Field of the Invention

The present invention relates generally to a cutting mat, and more particularly to an innovative structural design of a cutting mat having a locking function.

2. Description of Related Art Including Information Disclosed Under 37 CFR 1.97 and 37 CFR 1.98

The cutting mat disclosed in the present invention can be used as a mat for cutting cakes. A cutting mat is placed under paper or other objects to be cut, so as to prevent the cutter from damaging the desk or hurting the user. A cutting mat is an important aid during cutting operations.

A conventional cutting mat is made of a cutting resistant material and is usually in the form of a shaped plate with certain thickness and size. When using such a conventional cutting mat, the direction is fixed and the user can not adjust the cutting angle. In view of this problem, some manufacturers have developed a new design of cutting mat that can be turned to different angles. A cutting mat of this type usually includes a base plate and a rotary plate assembled above the base plate. The rotary plate can be pushed to rotate.

However, in actual applications, it is found that the above-mentioned cutting mat cable of rotation still have some problems. For example, as the rotary plate can rotate in relation to the base plate, when the user carries out the cutting operation, it is very likely that the rotary plate will be driven by the cutting force to have circular displacement. As a result, the cutting accuracy is affected and the user may have the risk of being hurt by the cutter. Hence, how to overcome this problem is an important technical issue to be tackled by manufacturers.

BRIEF SUMMARY OF THE INVENTION

The main object of the invention is to provide a lockable rotary cutting mat, aiming to find an innovative technical solution for the development of a new structure of cutting mat that is more ideal and practical.

Based on the above object, the present invention provides a lockable rotary cutting mat. Said lockable rotary cutting mat includes a base plate and a rotary plate assembled on the base plate, capable of rotation under a pushing force. The central bottom portion of the rotary plate is assembled on the center of the base plate through a rotary connector. The bottom of the base plate has anti-slip components. The rotary plate includes a cutting surface and a periphery, wherein the periphery is formed with at least one concave edge portion, and a locking component is configured at the corresponding position between the base plate and the periphery of the rotary plate. The locking component includes a moving base, a controller and a locking edge portion. The controller can be pushed to move forward or backward along a movement guiding axis preset on the moving base. The locking edge portion is connected to and can be driven by the controller to have a locked position and a released position. When the locking edge portion is at the locked position, it is aligned to and engaged with the corresponding concave edge portion, so as to fix the rotary plate.

Through the innovative structural design and technical feature, the invention made an inventive advancement over the prior art. With the unique locking component, when the rotation angle is decided by the user when operating the cutting mat, the controller can be pushed to engage the locking edge portion with the concave edge portion, so as to fix the rotary plate. Thus, it can effective enhance the cutting accuracy as well as the quality of the rotary cutting mat.

Another object of the invention is to realize a practical advancement by developing a thin and light cutting mat. The center of the base plate is formed with a round hole. The periphery of the round hole is formed with a thin ring edge with thickness less than that of the base plate. The rotary connector is an integrally formed shell in the shape of a round disc. The rotary connector is formed with a plurality of concentric convex rings with certain intervals. The plurality of convex rings go upward through the round hole is fixed onto the bottom portion of the rotary plate through adhesive. Between the neighboring convex rings, concave rings are relatively formed. Between the supporting ring face on the periphery of the rotary connector and the rotary plate, a clamping slit is defined and formed to clamp the thin ring edge inside.

Another object of the invention is to offer more convenience to users. The periphery of the rotary plate is distributed with concave edge portions in ring forms and with even intervals. The symmetric two sides of the base plate are formed with two concave portions that can be aligned to the concave edge portion along with the rotation of the rotary plate, so that, during the process of pushing the rotary plate, there are positioning points as the reference for angle of rotation.

A further object of the invention is to provide a hang hole so that the lockable rotary cutting mat can be convenient put aside to save space. The hang hole is formed on the base plate, and is located between the periphery of the rotary plate and the locking component. With the hang hole, the cutting mat can be hung on a hook provided on an existing wall or cupboard.

DETAILED DESCRIPTION OF THE INVENTION

Figure 1:
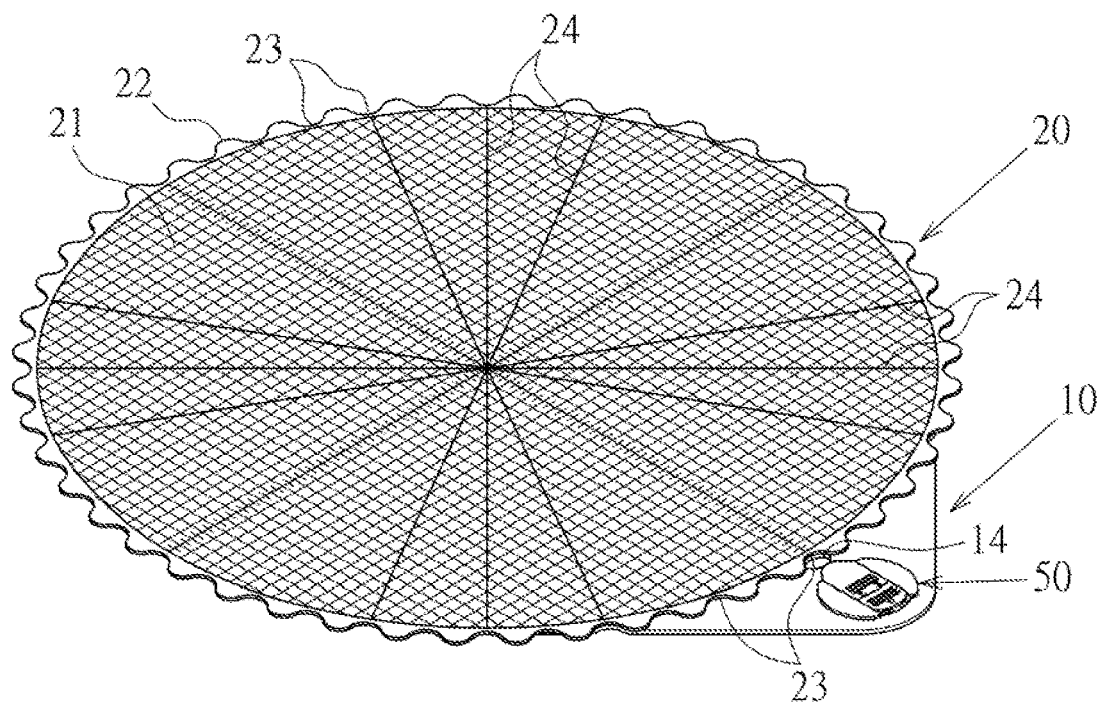
FIG. 1 is a combined perspective of a preferred embodiment of the invention in a top view.

FIG. 1 to FIG. 8 depict a preferred embodiment of the lockable rotary cutting mat according to the invention. It is to be understood, however, that such embodiment examples are for illustrative purpose only, and is not intending to limit the scope of the invention.

Said lockable rotary cutting mat includes a base plate 10 and a rotary plate 20 assembled on the base plate 10 in a way that it can be pushed to rotate. The central bottom portion of the rotary plate 20 is assembled on the center of the base plate 10 through a rotary connector 30. The bottom portion of the base plate 10 has anti-slip components 40. The rotary plate 20 includes a cutting surface 21 and a periphery 22, wherein the periphery 22 is formed with at least one concave edge portion 23, and at the corresponding position between the base plate 10 and the periphery 22 of the rotary plate 20, a locking component 50 is provided. The locking component 50 includes a moving base 51, a controller 52 and a locking edge portion 53. The controller 52 can be pushed to move forward or backward along the movement guiding axis preset on the moving base 51 in the L1 direction (see FIG. 6). The locking edge portion 53 is connected to and is driven by the controller 52 to have a locked position (see FIG. 8) and a released position (see FIG. 7). When the locking edge portion 53 is located at the locked position, it is aligned to and engaged with the concave edge portion 23, so as to fix the rotary plate 20.

Figure 3:
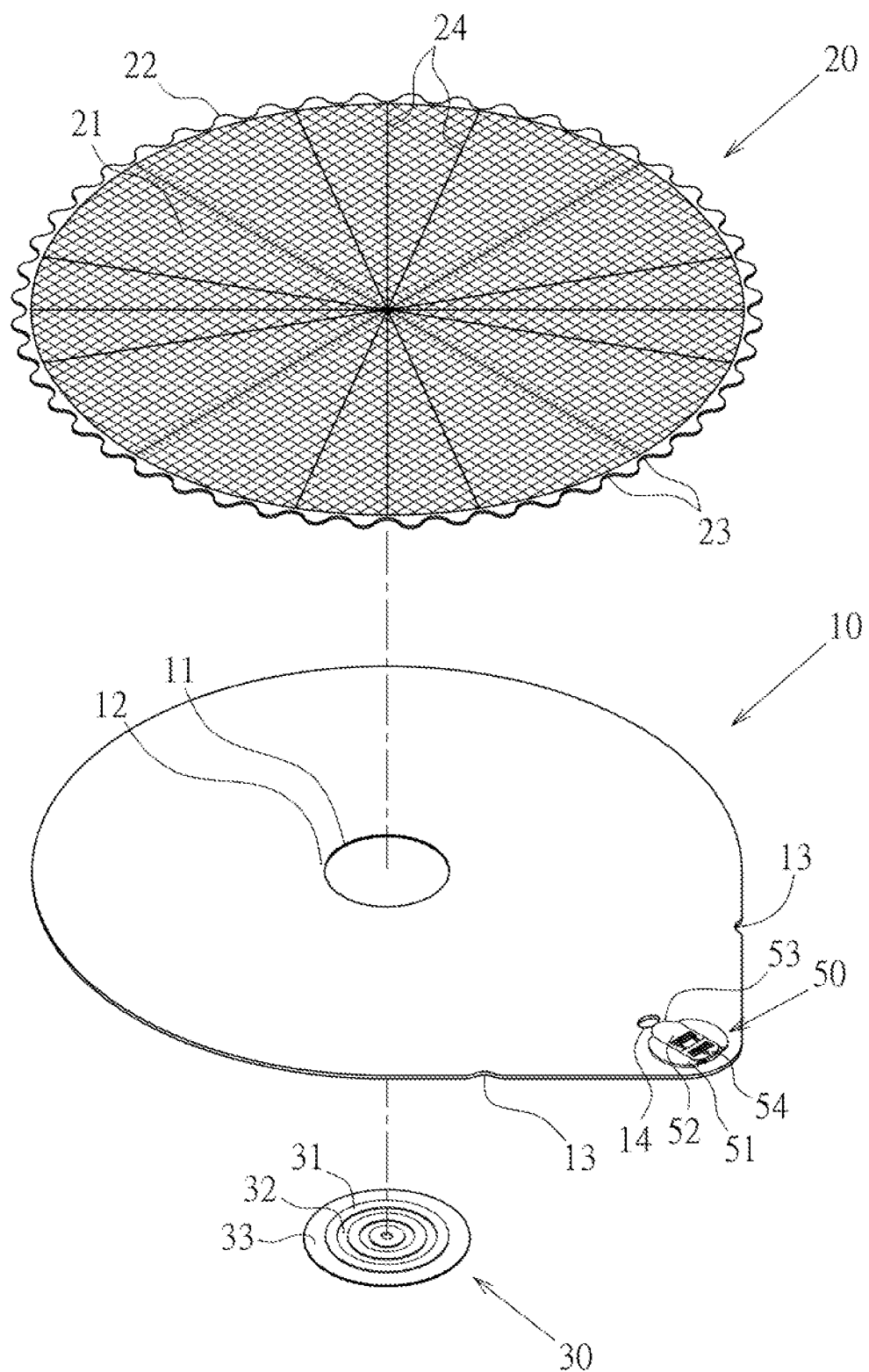
FIG. 3 is an exploded perspective of the main components of a preferred embodiment of the invention.
Figure 4:
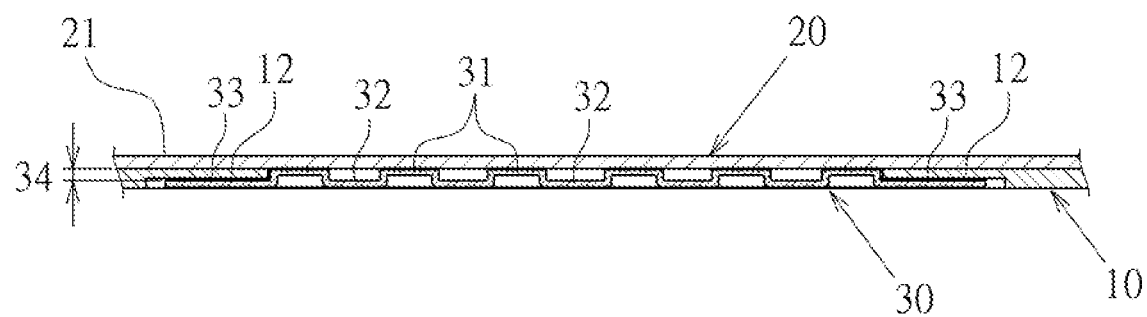
FIG. 4 is combined sectional view 1 showing partial structure of a preferred embodiment of the invention.
Figure 5:
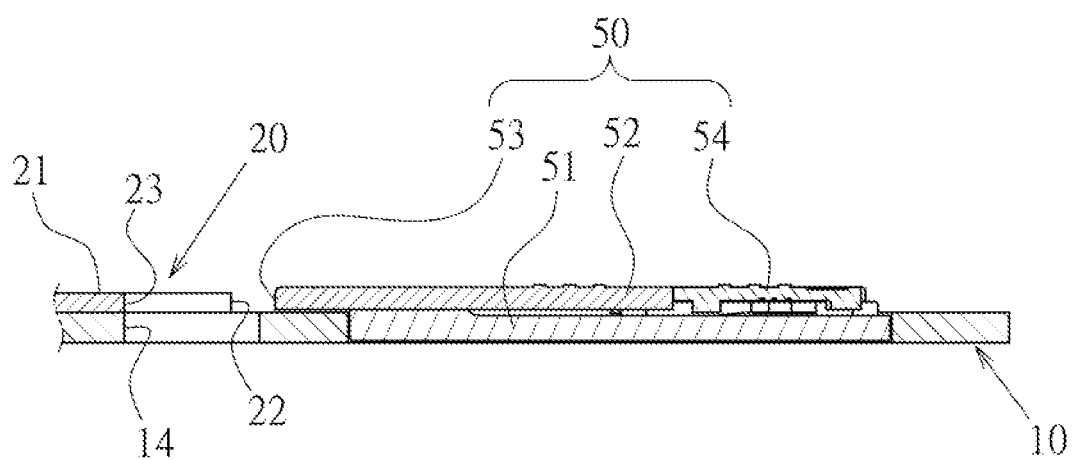
FIG. 5 is combined sectional view 2 showing partial structure of a preferred embodiment of the invention.
Figure 6:
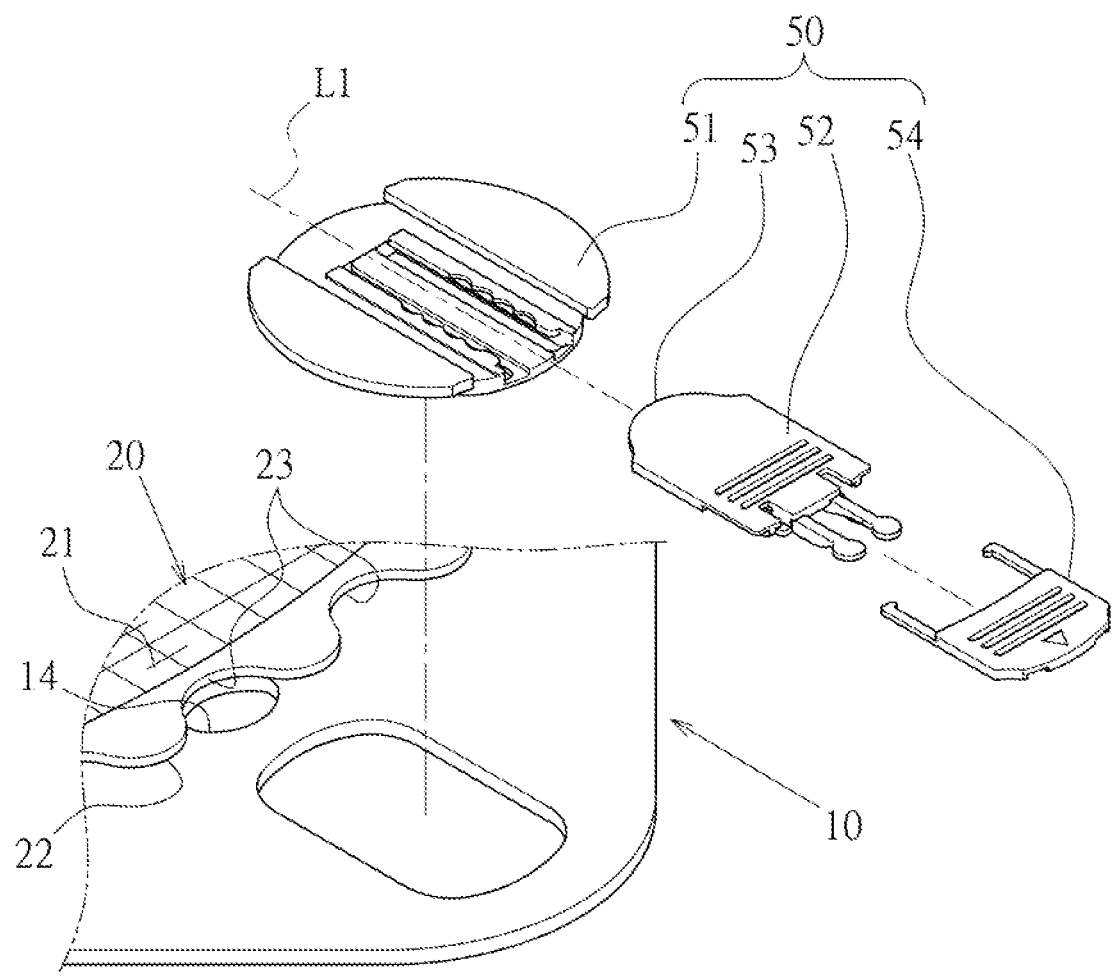
FIG. 6 is an exploded perspective of the locking component of a preferred embodiment of the invention.

Referring to FIG. 3, in the embodiment, the center of the base plate 10 is formed with a round hole 11. The periphery of the round hole 11 is formed with a thin ring edge 12 with its thickness less than that of the base plate 10. The rotary connector 30 is an integrally formed thin shell in the shape of a round disk. The rotary connector 30 is formed with a plurality of concentric convex rings 31 with certain intervals. The plurality of convex rings 31 go upward through the round hole 11 and is fixed on the bottom of the rotary plate 20 through adhesive (see FIG. 4). Between the neighboring convex rings 31, concave rings 32 are relatively formed. And the periphery of the rotary connector 30 is formed with a supporting ring face 33. Between the supporting ring face 33 and the rotary plate 20, a clamping slit 34 is defined and formed to clamp the thin ring edge 12 inside. The main efficacy of this embodiment is to achieve the advantage of a thin and light product by using a rotary connector 30 made of a thin shell in the shape of a round disk.

In particular, the anti-slip component 40 is in the form of printing, with thickness between 0.05 mm and 0.50 mm; the advantage of this embodiment is to provide a thin, smooth and anti-slip product. Specifically, as shown in FIG. 2, when the anti-slip components 40 are configured in the form of multiple concentric rings, they provide vacuum absorption like a suction cup, so that the lockable rotary cutting mat can be placed more stably and securely.

Figure 2:
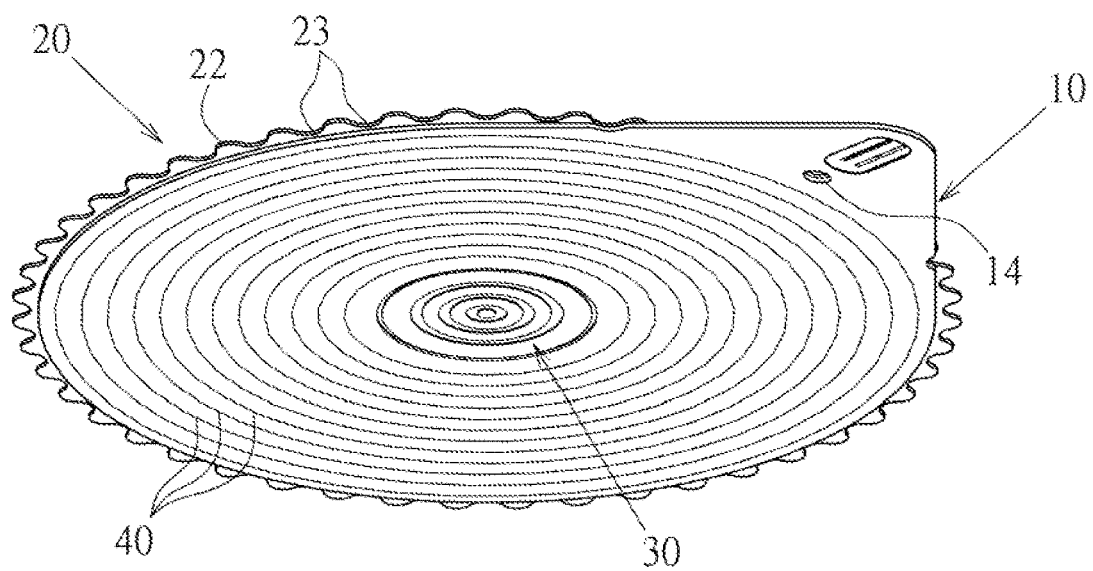
FIG. 2 is a combined perspective of a preferred embodiment of the invention in a bottom view.

Referring to FIG. 1 to FIG. 3, in this embodiment, the periphery 22 of the rotary plate 20 is distributed with several concave edge portions 23 with even circular intervals. The two symmetric sides of the base plate 10 are formed with two concave portions 13, each of the concave portions 13 can rotate along with the rotary plate 20 to be aligned to any of the concave edge portions 23. The efficacy of this embodiment is that, when the user's fingers push the rotary plate 20 to rotate (see FIG. 9), there are positioning points to serve as the reference for angle of rotation. In particular, between any two neighboring concave edge portions 23, the optimum peripheral path distance is set as 7.5 degrees, and the cutting surface 21 of the rotary plate 20 is correspondingly provided with a plurality of angle mark lines 24 for visual recognition, so as to help the user recognize the angle of rotational displacement. For example, if the user wants to rotate the rotary plate 20 by 30 degrees, the user can use fingers to tug the concave edge portion 23 for four times to rotate the plate for 30 degrees (7.5 degrees×4 times=30 degrees). This provides a convenient function for the user to achieve desired angle of rotation.

Referring to FIG. 1 and FIG. 3, in this embodiment, the base plate 10 is further formed with a hang hole 14, and the hang hole 14 is located between the periphery 22 of the rotary plate 20 and the locking component 50. Through the hang hole 14, the product can be hung on a hook configured on an existing wall or cupboard (not shown in the drawing), so as to facilitate storage of the lockable rotary cutting mat to save space occupation.

Figure 7:
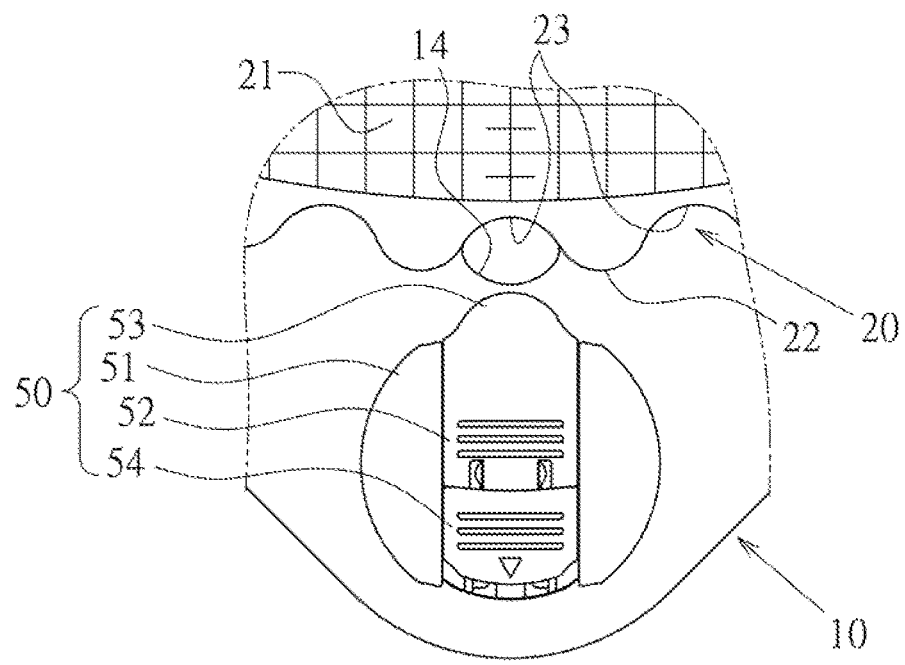
FIG. 7 is a top view of the locking edge portion at the released position.
Figure 8:
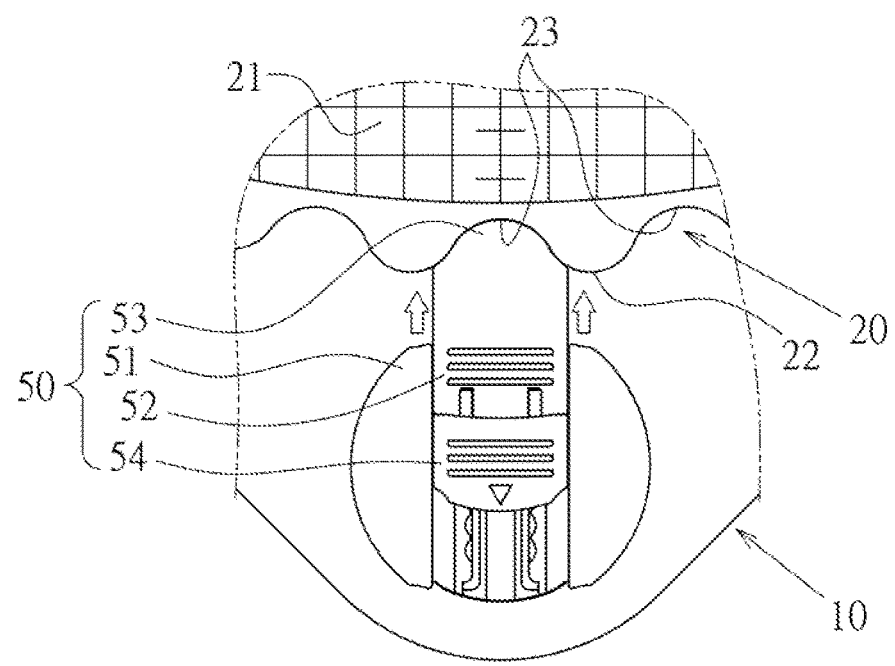
FIG. 8 is a top view of the locking edge portion at the locked position.
Figure 9:
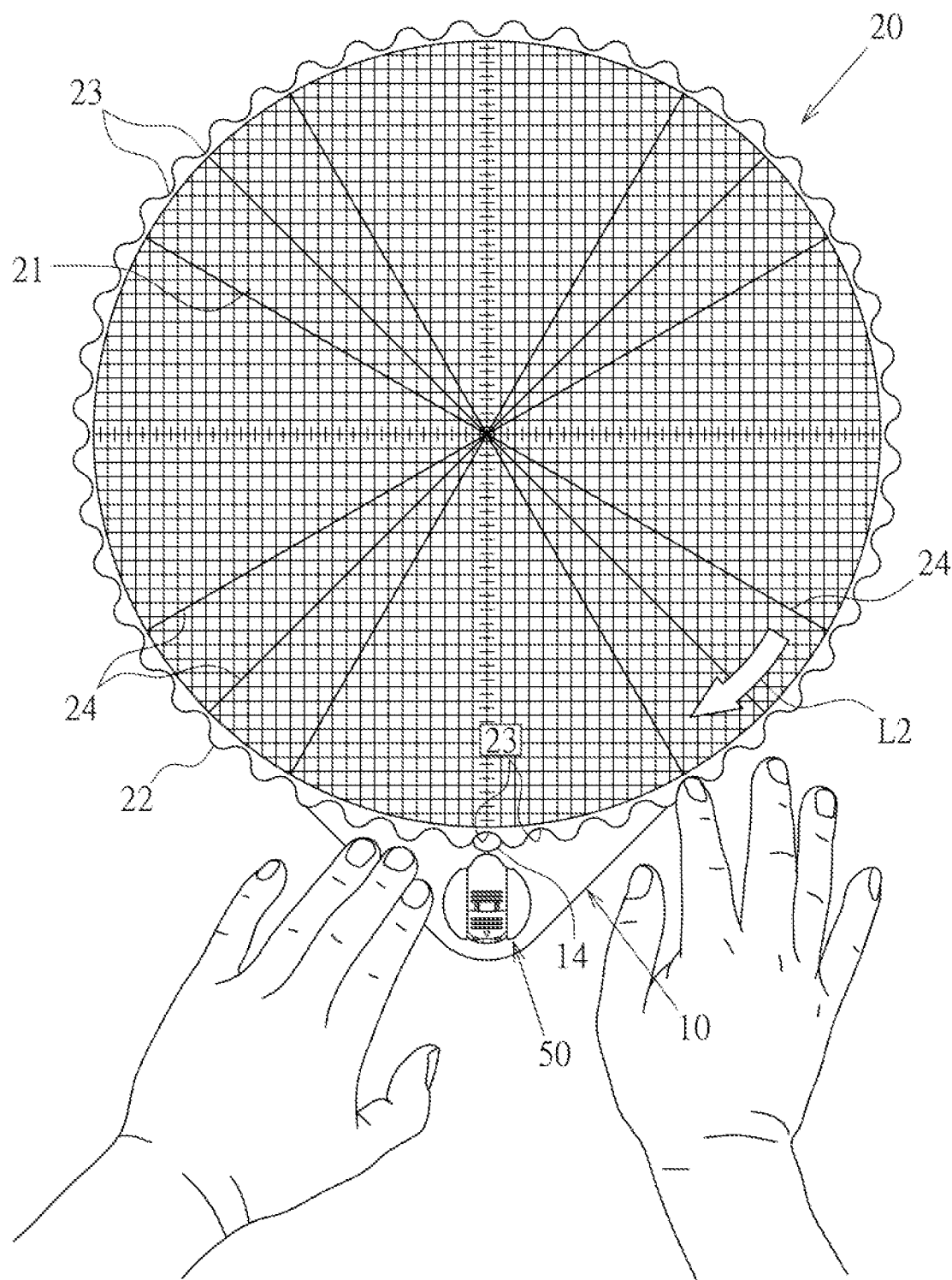
FIG. 9 is an operational view of the lockable rotary cutting mat.

Based on the above structural constitution and technical features, in actual applications of the preferred embodiment of the lockable rotary cutting mat according to the invention, as shown in FIG. 9, when the user wants to turn the rotary plate 20 to change its horizontal angle to a desired position, the user can use fingers to push the concave edge portion 23 to easily drive the rotary plate 20 to rotate (as indicated by Arrow L2 in FIG. 9), and when the user decides the rotation angle of the rotary plate 20, the user can use fingers to tug the controller 52 of the locking component 50, and push the locking edge portion 53 to the locked position (as shown in FIG. 8), so that it is aligned to and engaged with the concave edge portion 23 and the rotary plate 20 is stably fixed. On the contrary, to release the rotary plate 20, the user just needs to tug the controller 52 to push the locking edge portion 53 back to its released position (as shown in FIG. 7), and the rotary plate 20 can be rotated again.

Figure 10:
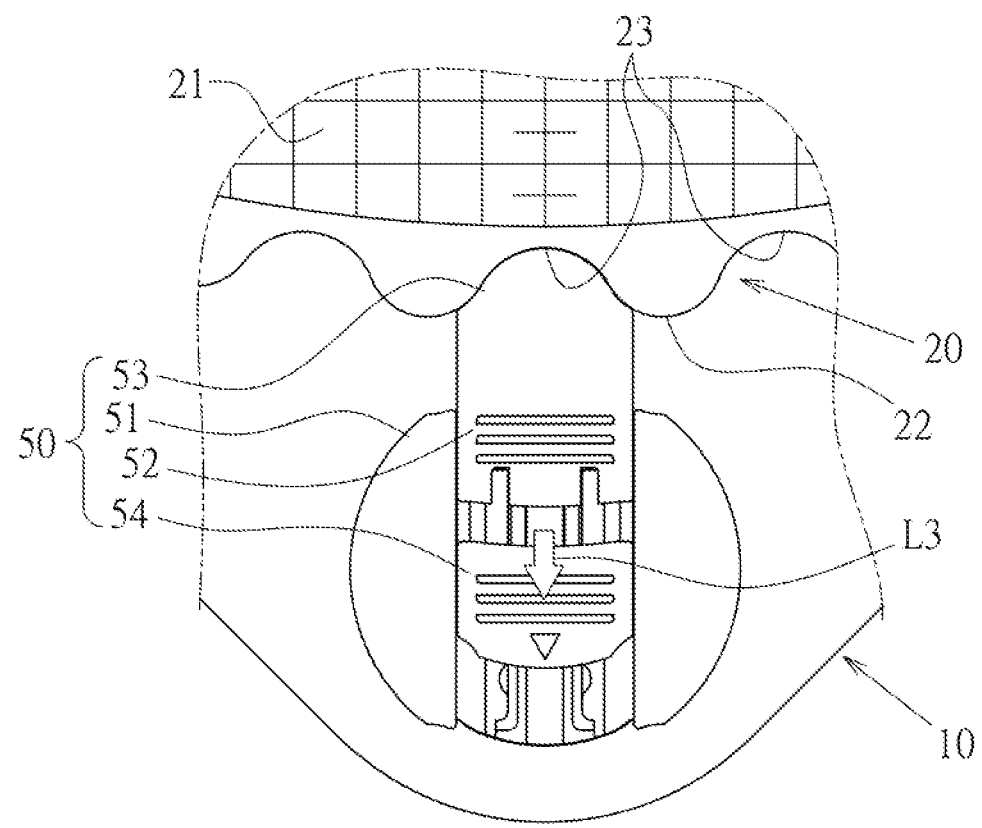
FIG. 10 is a state view showing the locking component of the invention includes a mode keeping piece to fix the controller.

Referring to FIG. 10, in this embodiment, the locking component 50 also includes a mode keeping piece 54 to fix the controller 52, so as to prevent it from moving forward or backward (as shown by the Arrow L3 in the drawing, the fixation is realized by pulling it backward). The main efficacy of this embodiment is to offer better safety by keeping the locking component 50 more stable and secure, so that the user may not be hurt during operations.

Further, in actual applications, the lockable rotary cutting mat can be used as an assistant mat for making cakes or any of clay, flower or hand crafts. (Note: The product is also applicable for operations with no cutting and only requiring rotation.)

I claim:

1. A lockable rotary cutting mat comprising:
    a base plate with an anti-slip surface at a bottom thereof; and
    a rotary plate assembled onto said base plate, said rotary plate being rotatable upon receiving a pushing force, said rotary plate having a central bottom portion assembled by a rotary connector onto a center of said base plate, said rotary plate having a cutting surface and a periphery, the periphery of said rotary plate having at least one concave edge portion, wherein a locking component is configured between said, base plate and the periphery of said rotary plate, the locking component having a movable base and a controller and a locking edge portion, the controller being movable forwardly or backwardly along a movement guiding axis on the movable base, the locking edge portion being connected to and drivable by said controller so as to have a locked position and a released position, the locking edge portion being aligned with and engaged with the at least one concave edge portion in the locked position, wherein the center of said base plate has a round hole, a periphery of the round hole having a ring edge, the ring edge having a thickness less than a thickness of said base plate, the rotary connector being a disc-shaped shell, the rotary connector having a plurality of concentric convex rings in spaced relation to each other, the plurality of concentric convex rings extending upwardly through the round hole and adhesively fixed to a bottom of said rotary plate between adjacent convex rings of said plurality of concentric convex rings, said rotary connector having a supporting ring face at a periphery thereof, a clamping slit being formed between the supporting ring face and said rotary plate, the clamping slit clamping to an interior of the ring edge.

2. The lockable rotary cutting mat of claim 1, wherein the anti-slip surface of said base plate has a thickness of between 005 millimeters and 0.50 millimeters.

3. The lockable rotary cutting mat of claim 1, wherein the at least one concave edge portion comprises a plurality of concave edge portions formed at the periphery of said rotary plate.

4. The lockable rotary cutting mat of claim 3, wherein adjacent concave edge portions of the plurality of concave edge portions have a peripheral path distance of 75 degrees, the cutting surface of said rotary plate having a plurality of angled work lines.

5. The lockable rotary cutting mat of claim 1, wherein said base plate has a hang hole located between the periphery of said, rotary plate and the locking component.

6. The lockable rotary cutting, mat of claim 1, wherein the locking component has a mode keeping piece adapted to restrain the controller from moving forwardly or backwardly.

* * * * *